United States Patent [19]

Marks et al.

[11] Patent Number: 5,578,690

[45] Date of Patent: Nov. 26, 1996

[54] SILYL-TERMINATED INTERPOLYMER OF ETHYLENE AND METHOD FOR PREPARING SILYL-TERMINATED POLYOLEFINS

[75] Inventors: Tobin J. Marks, Evanston; Peng-Fei Fu, Skokie, both of Ill.

[73] Assignee: Northwestern University, Evanston, Ill.

[21] Appl. No.: 431,521

[22] Filed: Apr. 28, 1995

[51] Int. Cl.$^6$ .......................... C08F 210/16; C08F 2/38
[52] U.S. Cl. .......................... 526/347; 526/82; 526/83; 526/84; 526/126; 526/128; 526/132; 526/134; 526/151; 526/160; 526/348; 526/348.5; 526/943; 526/348.3
[58] Field of Search .................. 526/82, 83, 84, 526/126, 128, 347, 348, 348.5, 943, 348.3, 132, 134, 151, 160, 170; 525/333.7, 342, 106

[56] References Cited

U.S. PATENT DOCUMENTS

| | | | |
|---|---|---|---|
| 4,668,773 | 5/1987 | Marks | 534/15 |
| 4,801,666 | 1/1989 | Marks | 526/123 |
| 4,871,705 | 10/1989 | Hoel | 502/117 |
| 4,965,386 | 10/1990 | Watson | 556/430 |
| 5,001,205 | 3/1991 | Hoel | 526/128 |
| 5,132,380 | 7/1992 | Stevens | 526/126 |
| 5,168,111 | 12/1992 | Canich | 526/160 |

FOREIGN PATENT DOCUMENTS

| | | | |
|---|---|---|---|
| 0940190 | 10/1963 | United Kingdom | 525/342 |

OTHER PUBLICATIONS

Metallocene Catalysis: Polymers by Design? Horton, A. D. Trip vol. 2, No. 5, May 1994.

Journal of Organometallic Chemistry, 479 (1994) 1–29 Homogeneous Group 4 Metallocene Ziegler–Natta Catalysts: The Influence of Cyclopentadienyl–Ring Substituents.

Makromol. Chem., Macromol. Symp 48/49, 317–332 (1991) Functional Polypropylene Blend Compatibilizers.

J. Am. Chem. Soc. 1985, 107, 8091–8103; Highly Reactive Organo–Lanthanides. Systematic Routes to and Olefin Chemistry of Early and Late Bis(Pentamethylcyclopentadienyl) 4f Hydrocarbyl and Hydride Complexes.

Macromolecules, vol. 26, No. 26, (1993) Metallocene–Aluminoxane Catalysts for Olefin Polymerizations.

Polymer Preprints, vol. 35(1); Mar. 1994 Synthesis of Low Polydispersity, End–Capped Polyethylene Using Living CO(III) Catalyst.

*Primary Examiner*—Fred Teskin
*Attorney, Agent, or Firm*—Alexander Weitz

[57] ABSTRACT

There is disclosed a method for synthesizing polyolefins having a silyl group at one terminus, said method comprising reacting (A) a monomer selected from the group consisting of ethylene and a combination of ethylene and an α-olefin; and (B) a silane having the formula

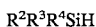

$R^2R^3R^4SiH$ wherein $R^2$, $R^3$ and $R^4$ each represents a monovalent group selected from the group consisting of hydrogen, alkyl having 1 to 4 carbon atoms, aryl, alkylaryl, arylalkyl, alkoxy having 1–4 carbon atoms, phenoxy, fluorinated alkyl having 3 to 6 carbon atoms, a dialkylamino group in which the alkyl groups contain 1 to 4 carbon atoms and a diorganopolysiloxane chain containing 1 to 10 siloxane units, said reaction taking place in the presence of (C) a catalyst comprising a metallocene compound.

15 Claims, No Drawings

SILYL-TERMINATED INTERPOLYMER OF ETHYLENE AND METHOD FOR PREPARING SILYL-TERMINATED POLYOLEFINS

FIELD OF THE INVENTION

The present invention relates to a method for the preparation of silyl-functionalized polyolefins. More particularly, the invention relates to a method for synthesizing polyolefins having a silyl group at one terminus, said method comprising polymerizing α-olefins in the presence of a metallocene catalyst using a silane as a chain transfer agent.

BACKGROUND OF THE INVENTION

The production of polyethylene and copolymers of polyethylene with α-olefins by Ziegler-Natta polymerization processes has evolved considerably since their introduction in the early 1950s. Control of molecular weight (MW) is important as it influences the final physical properties of the polymer. The MW is controlled by chain transfer reactions which terminate the growth of the polymer chains. A number of such chain transfer processes, including β-H elimination, β-alkyl elimination, and chain transfer to $MR_2$ (M=Zn, Al, etc.), monomer and hydrogen have been identified. Of these, hydrogen has been found to be the only practical chain transfer agent since it is generally easy to use and normally does not affect the activity of the catalyst. However, there are many cases where even hydrogen does not provide the optimum results due to some undesired side effects (e.g., unresponsive M—R bonds, over activation of the catalyst, too rapid hydrogenation of other functional groups). Therefore, alternative chain transfer agents for use in the production of polyethylene, and copolymers thereof, are highly desirable.

Furthermore, the use of hydrogen as a chain transfer agent results in a non-functional, saturated polymer chain end, whereas terminally functionalized polymer is of great current interest. Such a polymer could be used as precursor for making block or graft polymer and would be expected to exhibit modified chemical and physical properties. A silyl-functional polyethylene of this type has been prepared by Brookhart et al. (*Polymer Preprints*, Vol. 35(1), 1994) using a cationic cobalt alkyl complex. However, this synthesis presents the following disadvantages: 1) this process is not truly catalytic, 2) the silane does not act as a chain transfer agent and therefore does not control molecular weight of the target polymer; 3) the silane does not regenerate a catalyst; and 4) the method is only effective with ethylene while substituted olefins, such as propylene and butylene, do not react when using the cobalt initiator.

It has also been disclosed by Watson et al. in U.S. Pat. No. 4,965,386 that an olefin can be hydrosilated by contacting the α-olefin with a silane in the presence of a metallocene catalyst. In this preparation, only the silylated monomeric product was obtained. Watson et al. do not suggest the formation of a polymer or any hydrosilated product derived from repetitive olefin insertion, nor do they suggest the use of ethylene or mixtures of ethylene and an α-olefin.

SUMMARY OF THE INVENTION

It has now been discovered that certain silanes can be used as chain transfer agents when ethylene, or a combination of ethylene and an α-olefin, is polymerized with certain metallocene catalysts. Unlike the procedure described by Watson et al., cited supra, the instant method results in an ethylene polymer, or interpolymer of ethylene and an α-olefin, having a silyl group at one terminus of its chain. Moreover, the method of the present invention is catalytic and has a significantly improved rate of polymer production relative to the preparation described by Brookhart et al., cited supra, and is therefore more suitable for commercial application. The method of the present invention, therefore, comprises reacting (A) ethylene, or a combination of ethylene and an α-olefin, and (B) a silane in the presence of (C) a catalyst comprising a metallocene compound to form the corresponding polyethylene homopolymer, or interpolymer of ethylene and α-olefin, having one silyl terminal group.

DETAILED DESCRIPTION OF THE INVENTION

Component (A) of the present invention is selected from ethylene or a combination of ethylene and at least one α-olefin having the general formula $$H_2C=CH(R) \tag{i}$$

in which R is a monovalent group selected from alkyl radical having 1 to 10 carbon atoms or an aryl group. Specific examples of suitable α-olefins of formula (i) include styrene, propene, 1-butene, 1-pentene, 1-hexene and 1-octene. Preferably component (A) is ethylene or a combination of ethylene with styrene, propene or 1-hexene. When one or more of the above described α-olefins (i) is used together with ethylene, the resulting product is the corresponding copolymer or terpolymer (i.e., an interpolymer in the general case where at least one co-monomer is used). For the purposes of the present invention, up to about 90 mole percent of the α-olefin (i) may be used in component (A). Since the reactivity of the α-olefins is generally less than that of ethylene, a large excess of (i) may be needed to incorporate such olefin units into the interpolymer and such reactivity ratios may be determined by routine experimentation. When component (A) is a combination of ethylene and an α-olefin (i), it is preferred that about 10 to about 80 mole percent of (i) is used therefor.

Component (B) of the instant method is a silane having the formula $$R^2R^3R^4SiH \tag{ii}$$

wherein $R^2$, $R^3$ and $R^4$ each represents a monovalent group independently selected from hydrogen, alkyl radicals having 1 to 4 carbon atoms, aryl radicals such as phenyl and tolyl, alkylaryl radicals such as ethylphenyl and ethyltolyl, arylalkyl radicals such as phenylethyl and benzyl, alkoxy radicals having 1 to 4 carbon atoms, phenoxy radical, fluorinated alkyl radicals having 3 to 6 carbon atoms such as 3,3,3-trifluoropropyl, a dialkylamino group in which the alkyl groups contain 1 to 4 carbon atoms and a diorganopolysiloxane chain containing 1 to about 10 siloxane units in which the organic groups are independently selected from alkyl radicals having 1 to 4 carbon atoms, aryl radicals, fluorinated alkyl radicals or alkoxy radicals having 1 to 4 carbon atoms.

Preferred groups which are bonded to the silicon atom of formula (ii) include hydrogen, methyl, ethyl, isopropyl, isobutyl, phenyl, methoxy, ethoxy, chlorine, 3,3,3-trifluoropropyl, dimethylamino and siloxane groups of the formula $R'_3SiO(SiR'_2O)_j—$ (iv)

in which R' is independently selected from methyl, phenyl, 3,3,3-trifluoropropyl, methoxy or ethoxy groups and j has a value of 0 to 10. Highly preferred silanes according to the instant method are phenylsilane, diphenylsilane, phenylmethylsilane, pentamethyldisiloxane, methylsilane and dimethylsilane.

Catalyst (C) is selected from a metallocene catalyst or a metallocene catalyst in combination with a co-catalyst. The metallocene catalyst of the invention has its general formula selected from

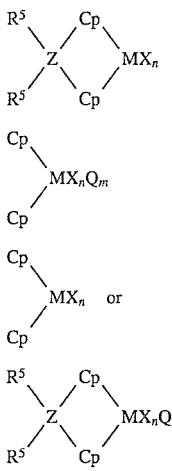

wherein Cp denotes a cyclopentadienyl or a substituted cyclopentadienyl radical. Examples of substituted Cp groups include $C_5R*_5$ (applicable to structures vi and vii) and $C_5R*_4$ (applicable to structures v and viii), in which R* is selected from the group consisting of hydrogen, alkyl having 1 to 20 carbon atoms, aryl having 6 to 18 carbon atoms and triorganosilyl, such as trimethylsilyl. Specific Cp groups are include pentamethylpentadienyl ($Cp'=\eta^5-C_5Me_5$) and tetramethylpentadienyl ($Cp''=\eta^5-C_5Me_4$), wherein Me hereinafter denotes a methyl radical and $\eta^5$ indicates pentavalent coordination with the metal, described infra. In above formulas (v) through (viii), Z is selected from Si, C, Ge or Sn and $R^5$ is independently selected from alkyl radicals having 1 to 4 carbon atoms, aryl radicals having 6 to 8 carbon atoms and methoxy. Preferably, Z is Si and each $R^5$ is methyl. M is a metal selected from Group 3 elements, Group 4 elements or Lanthanide series elements. Specifically, M may be Sc, Y, La, Ac, Ti, Zr, Hf, Ce, Pr, Nd, Pm, Sm, Eu, Gd, Tb, Dy, Ho, Er, Tm, Yb or Lu. Preferably M is selected from La, Y, Sm, Zr, Ti, Hf, Nd or Lu. X is a metal ligand selected from hydrogen, halogen, alkyl radicals having 1 to 8 carbon atoms, substituted alkyl radicals having 1 to 8 carbon atoms, allylic radicals having 3 to 6 carbon atoms or aryl radicals having 6 to 8 carbon atoms. Q in formulas (vi) and (viii) is an anionic counterion of an element selected from boron, aluminum, gallium, zinc or cadmium. Examples of preferred Q groups include $\{MeB(C_6F_5)_3\}^-$ and $\{B(C_6F_5)_4\}^-$. In the above formulas, n and m are integers, each having a value of 1 to 3 such that (m+n) satisfies the valence of metal M.

Specific examples of the above metallocene catalysts include compounds having the following formulas, in which Me, Cp' and Cp" have their previously defined meanings and Cp''' denotes $C_5H_5$:

$Cp'_2SmH$
$Cp'_2YCH(SiMe_3)_2$
$Cp'_2LaH$

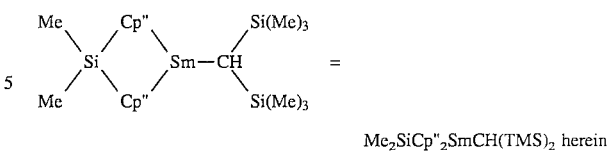

$Me_2SiCp''_2SmCH(TMS)_2$ herein $\{Cp'_2ZrMe\}\{MeB(C_6F_5)_3\}$
$\{Cp'_2ZrMe\}\{MeB(C_6F_5)_3\}$
$\{Cp'''_2ZrMe\}\{MeB(C_6F_5)_3\}$
$\{Cp'''_2ZrMe\}\{MeB(C_6F_5)_3\}$ and

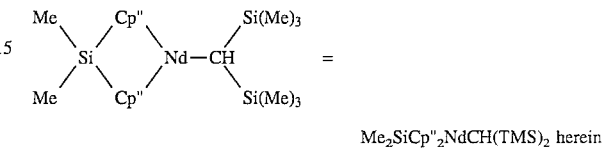

$Me_2SiCp''_2NdCH(TMS)_2$ herein wherein TMS represents a trimethylsilyl group. Those skilled in the art will, of course, recognize that catalysts such as $Me_2SiCp''_2SmCH(TMS)_2$ undergo a rate-determining activation reaction to form the corresponding hydride (e.g., $Me_2SiCp''_2SmH$).

The above described catalysts are known in the art and they may be employed in particulate form, as a homogeneous solution or supported on inert materials such as alumina, methylalumoxane-activated silica, silica, silica-alumina and magnesium chloride, inter alia. They may be prepared by, e.g., methods taught by Den Haan et al. in *Organometallics*, vol. 5, 1726–33, 1986, Möhring et al. in *Journal of Organometallic Chemistry*, v. 479, 1–29, 1994, U.S. Pat. Nos. 4,871,705 and 5,001,205 to Hoel, U.S. Pat. Nos. 4,801,666 and 4,668,773 to Marks, and by Marks et al. in *Journal of the American Chemical Society*, v. 107, 8091–8103, 1985.

For the purposes of the present invention, a co-catalyst is also added when m=0 and n=2 in formulas (v) through (viii) (i.e., when M=Ti, Zr or Hf). This co-catalyst is used, for example, to activate the metallocene catalyst and may be selected from alkylalumoxanes, trialkyl boron compounds in which the alkyl radicals have 1 to 8 carbon atoms or triaryl boron compounds in which the aryl radicals have 6 to 8 carbon atoms. A highly preferred co-catalyst is methylalumoxane (MAO). Certain co-catalysts, such as MAO, also act as oxygen scavengers and desiccants and are beneficial for these functions as well. Alternatively, the co-catalyst can be a compound having the formula $AlG_kR^6_{(3-k)}$ in which G is selected from hydrogen, halogen, alkyl radicals having 1–8 carbon atoms or aryl radicals having 6 to 8 carbon atoms, $R^6$ is an alkyl radical having 1–8 carbon atoms and k is an integer having a value of 0 to 3.

Various metallocene catalysts which require a co-catalyst are illustrated, e.g., in above cited U.S. Pat. Nos, 4,871,705 and 5,001,205 to Hoel, the disclosures of which are hereby incorporated by reference. Particularly, catalysts having the above formulas (v) through (viii) wherein X=halogen require a co-catalyst, and MAO is preferably used in combination therewith. Such catalyst combinations may be illustrated by the following, wherein Cp' and Cp have their previously defined meanings (see, e.g., Tritto et al., *Macromolecules*, v. 26, 7111–15, 1993):

$Cp'_2HfCl_2/MAO$
$Cp'_2ZrCl_2/MAO$
$Cp_2TiMeCl/MAO$ and
$Cp_2TiMe_2/MAO$

Based on the instant disclosure and the patent as well as scientific literature, those skilled in the art will readily identify circumstances wherein a co-catalyst is desirable by routine experimentation (e.g., based on rate of reaction, polymer yield and molecular weight).

In a preferred embodiment of the instant method, catalyst (C) and silane (B) are first mixed, preferably in a non-polar hydrocarbon solvent, such as toluene, butane, pentane, hexane, octane and iso-octane, for example. Preferably the solvent is toluene. Alternatively, the silane itself can act as a solvent if a low molecular weight polymer is desired. The above mixing operation must avoid the introduction of moisture or oxygen. The latter condition may be satisfied by running the reaction under an inert atmosphere, such as nitrogen or argon, as is standard in the art.

Ethylene (or a mixture of ethylene and α-olefin) is introduced while the ingredients are vigorously agitated and the polymerization reaction is carried out at a temperature of about −100° C. to 200° C., preferably at 25° to 80° C. The pressure during polymerization is typically controlled at 1 to 100 atmospheres, preferably 1 to 5 atmospheres, and is determined by temperature in a closed system or by the pressure of the volatile components in a continuous polymerization. When an α-olefin having a boiling point above the reaction conditions is used, it may be added simultaneously with the ethylene. When the silane is a gas under the reaction conditions, it may also be added simultaneously with the ethylene (or ethylene plus α-olefin) in the desired ratio to produce the silyl-terminated polymer or interpolymer. Upon completion of the reaction, silyl-terminated polymer generally precipitates out of solution when a solvent is used. The polymer can also be recovered by evaporating the solvent. If the reaction is to be carried out without the use of a solvent (e.g., in a gas phase reaction using a supported catalyst), the reaction temperature is preferably adjusted such that the silane and α-olefin are both gases. In this case, the mixture of ethylene, silane and α-olefin is exposed to the catalyst and the polymer formed may be removed as a melt from the bottom of the reactor. The polymer or copolymer may be purified by re-precipitation or by some other conventional technique.

The above polymerization may be summarized by the following generalized equation for ethylene:

wherein $R^2$ through $R^4$ have their previously defined meanings and x represents the average degree of polymerization (DP). Although the inventors of the instant method do not wish to be bound by a particular mechanism or theory, it is believed that, at least for the lanthanide catalysts of the invention, the metal hydride undergoes rapid multiple ethylene insertion during propagation; this is followed by polymer chain transfer to the silicon of the silane, resulting in the silyl-capped polyethylene (or ethylene interpolymer when an α-olefin is used) and the simultaneous regeneration of active catalyst, which readily participates in the next catalytic cycle.

The method of the invention clearly demonstrates that silane (B) can serve as an effective chain transfer agent in the polymerization of ethylene, or ethylene in combination with the above α-olefins, using metallocene containing catalyst (C). Therefore, the molecular weight of the resulting ethylene polymer or copolymer can be controlled by adding the appropriate amount of silane (B), as illustrated infra.

Furthermore, the instant method may be used to prepare a novel silyl-terminated interpolymer between ethylene and at least one of the above described α-olefins wherein one terminus of the interpolymer is a silyl group of the formula $R^2R^3R^4Si-$ which $R^2$, $R^3$ and $R^4$ are defined as above.

It has also been discovered that the rate of formation of the silyl-terminated polymer is significantly higher than that observed by Brookhart et al., cited supra. This rate can be further augmented by increasing the concentration of the α-olefin (e.g., increased pressure of α-olefin when the latter is a gas), increasing the catalyst concentration or raising the temperature.

The silyl-terminated polyethylene polymer or interpolymer produced according to the method of the present invention find utility in the preparation of block copolymers or star block copolymers (e.g., when the silyl end group contains one or more reactive sites such as SiH) for application as polymer compatibilizers. They may also be used to modify the surface of plastics such as polyolefins for coating or adhesion purposes.

EXAMPLES

The following examples are presented to further illustrate the method of this invention, but are not to be construed as limiting the invention, which is delineated in the appended claims. All parts and percentages in the examples are on a weight basis and all measurements were obtained at 25° C., unless indicated to the contrary. The notation Ph is used to denote phenyl radical.

Examples 1–9

The following typical procedure was used for the polymerization of ethylene. A dried 25 mL flask equipped with a magnetic bar was charged (in a glove box) with 0.029 mmol of a given catalyst (second column of Table 1). The flask was sealed, removed from the glove box and connected to a high vacuum line, whereupon 10 mL of dry toluene and a measured amount of phenylsilane were condensed into the flask under vacuum at −78° C. The third column of Table 1 shows the molar concentration of silane in toluene used in each case. The mixture was then vigorously stirred and quickly warmed to 23° C. while ethylene gas (1 atmosphere pressure) was introduced to the flask. After a measured time (fourth column of Table 1), the reaction was stopped by the addition of a small amount of methanol. The precipitated polymer was collected by filtration, washed with toluene and acetone, dried under high vacuum, and weighed for yield determination (fifth column of Table 1). Herein the conventional notation of $M_n$ and $M_w$ for number average and weight average molecular weight, respectively, is used throughout.

The $^1$H NMR (nuclear magnetic resonance) of each polymer at 140° C. in $C_2D_2Cl_4$ revealed the expected resonance at δ4.35 ppm characteristic of silane protons, which was resolved into a triplet due to the coupling to adjacent $CH_2$ group (J=3.6 Hz) when the polymer molecular weight was low ($M_n$: 600–1000). A strong peak at δ1.32 ppm is attributed to the polyethylene protons. The corresponding $^{13}$C NMR signal of the $CH_2$ group connected to the silyl group was found at δ11.28 ppm; this split into a triplet (J=118 Hz) in the $^{13}$C ($^1$H coupled) NMR spectrum, the methyl group of the other end of polymer chain has a chemical shift of δ15.06 ppm (q,$^1$ $^J$C—H=127 Hz). The presence of the silyl end group was also verified by its strong infrared adsorption at 2109 cm$^{-1}$, which is typical of Si—H stretching frequency, in addition to the absorptions derived from polyethylene moiety. The absence of resonances at δ4.5 to 6.0 ppm in the $^1$H NMR spectrum indicates that silyl-capped polyethylene was formed cleanly. It is thus believed that β-H elimination, which is responsible for chain termination in the absence of silane, is not operative and the process involving chain transfer directly to silicon of the silane reagent (Si—H/M—C transposition) is dominant in the present system.

The catalyst activity was calculated and appears in the sixth column of Table 1, the units being kg of polymer formed per mole of metal per hour. Number average molecular weight and the polydispersity of these silyl-terminated polyethylenes are shown in the last two columns of Table 1, respectively.

From Table 1 it can be seen that, for a given catalyst, increasing the $PhSiH_3$ concentration resulted in the gradual decrease of the polymer molecular weight (Examples 1–5). When these data were plotted, an essentially linear inverse correlation between $M_n$ and silane concentration was observed, clearly indicating that $PhSiH_3$ acts as a true chain transfer reagent. The molecular weight distribution of about 2 is also consistent with a homogeneous system having identical active centers with one major chain termination. Furthermore, variation of the lanthanide element and ligation of the catalyst show no apparent influence on the molecular weight of the ensuing polymer (Table 1, Examples 4, 6, 7, 8, 9). However, activity increased when the catalyst was sterically relatively open, as shown in Table 1 (La: 828>Sm: 342>Y: 300>Lu: 244 kg/mol of Ln-hour).

It was also observed that the $Cp'_2LuH$ catalyst (Example 6) resulted in polyethylene having about 32% mol vinyl terminal groups (i.e., 32% of the non-methyl ends). It is believed that the vinyl formation in this case, wherein the lanthanide element was relatively small, indicates that the rates of the two competing termination processes of β-H elimination and hydrosilanolysis are comparable.

Examples 11–14

The procedure of Example 10 was repeated wherein 14 mg of $\{Cp'''_2ZrMe\}\{MeB(C_6F_5)_3\}$, 10 mL of toluene and the indicated amount of phenylmethylsilane ($PhMeSiH_2$) shown in the second column of Table 2 (M=molarity in the toluene solution) were mixed and ethylene at 1 atm. was introduced at 23° C. over a period of 1 hour. The reaction was stopped by adding methanol and the polymers were recovered as before. These reactions are summarized in Table 2.

TABLE 2

| Example | Silane (M) | Time (min) | Yield (g) | $M_n$ | $M_w/M_n$ |
| --- | --- | --- | --- | --- | --- |
| 11 | 0.35 | 5 | 1.2 | 3080 | 6.5 |
| 12 | 0.66 | 5 | 1.9 | 1900 | 3.6 |
| 13 | 1.68 | 5 | 3.3 | 1280 | 3.1 |
| 14 | 2.43 | 15 | 3.3 | 1320 | 4.1 |

Example 15

The procedure of Examples 1–9 was repeated wherein 15 mg (0.025 mmol) of $Me_2SiCp''_2SmCH(TMS)_2$, defined supra, 10 mL of toluene and 1 mL (8.12 mmol) of phenylsilane ($PhSiH_3$) were mixed and ethylene at 0.25 atm. was introduced at room temperature over a period of one hour. The reaction was stopped by adding 1 mL of methanol and the polymer recovered as before (yield=0.52 g).

The number average molecular weight of this silyl-terminated polyethylene was 800. $^1H$ NMR (toluene-$d_8$, relative intensity): δ7.50 (Ph, 1.8), 7.20 (Ph, 2.0); 4.45 ($SiH_2$, 1.7); 1.30 $\{(CH_2CH_2)_p, 100\}$.

TABLE 1

ETHYLENE POLYMERIZATION IN THE PRESENCE OF $PhSiH_3$ USING ORGANOLANTHANIDE (Ln) COMPLEXES AS CATALYSTS

| Example | Catalyst | ($PhSiH_3$) (M) | Reaction Time (min) | Yield (g) | Activity (kg/mol of Ln h) | $M_n$ | $M_w/M_n$ |
| --- | --- | --- | --- | --- | --- | --- | --- |
| 1 | $CP'_2SmH$ | 0.08 | 2 | 0.69 | 713 | 57000 | 2.1 |
| 2 | $CP'_2SmH$ | 0.24 | 2 | 0.80 | 827 | 7600 | 4.2 |
| 3 | $CP'_2SmH$ | 0.46 | 4 | 0.65 | 330 | 5000 | 6.1 |
| 4 | $CP'_2SmH$ | 0.74 | 2 | 0.33 | 342 | 4400 | 4.3 |
| 5 | $CP'_2SmH$ | 1.06 | 4 | 0.64 | 311 | 2600 | 2.8 |
| 6 | $CP'_2LuH$ | 0.74 | 40 | 4.45 | 244 | 2090 | 5.2 |
| 7 | $CP'_2YH$ | 0.74 | 2 | 0.35 | 300 | 4900 | 2.2 |
| 8 | $CP'_2LaH$ | 0.74 | 1.5 | 0.59 | 828 | 4090 | 3.5 |
| 9 | $Me_2SiCp''_2SmCH(TMS)_2$ | 0.74 | 25 | 0.24 | 28 | 2550 | 2.9 |

Example 10

The procedure according to Examples 1–9 was repeated wherein 15 mg (0.020 mmol) of $\{Cp'''_2ZrMe\}\{MeB(C_6F_5)_3\}$ ($Cp'''=C_5H5—$), 10 mL of toluene and 2 mL (0.011 mmol) of diphenylsilane ($Ph_2SiH_2$) were mixed and ethylene at 0.25 atm. was introduced at room temperature over a period of one hour. The reaction was stopped by adding 1 mL of methanol and the polymer recovered as before (yield=1.2 g).

The number average molecular weight of this silyl-terminated polyethylene was 8200. $^1H$ NMR (toluene-$d_8$, relative intensity): δ7.50 (Ph, 0.2), 7.12 (Ph, 0.2); 4.50 ($SiH_2$, 0.2); 1.34 $\{(CH_2CH_2)_p, 100\}$.

Example 16

The procedure of Example 15 was repeated wherein 12 mg (0.020 mmol) of $Me_2SiCp''_2SmCH(TMS)_2$, defined supra, 10 mL of toluene and 0.5 mL (4.1 mmol) of phenylsilane ($PhSiH_3$) were mixed and 2 mL (16 mmol) of 1-hexene were condensed into the flask at −78° C. The mixture was warmed to 23° C. and ethylene at 1 atm. was introduced with vigorous stirring over a period of 3 hours. The reaction was then stopped by adding approximately 1 mL of methanol and the polymer recovered, washed with methanol and acetone and dried as before (yield=0.5 g).

The number average molecular weight was 1500.

$^1$H NMR (C$_2$D$_2$Cl$_4$, 120° C.): δ7.57 (m), 4.35 (t, J=3.6 Hz), 1.54 (m), 1.32 (m, strong), 1.15 (m), 0.95 (m, strong). Also from $^1$H NMR, it was determined that 15% mol of the 1-hexene units were incorporated into this silyl-terminated copolymer.

The above procedure was repeated using between 0.5 and 5.0 mL of 1-hexene dissolved in 10 mL of toluene to prepare silyl-terminated copolymers having a ratio of ethylene to hexene units in the range of 10:1 to 10:6, respectively. As before, NMR analysis ($^1$H, $^{13}$C) of the polymer revealed the expected silane resonances.

Example 17

In a glove box, a 25 mL flamed, round-bottom flask equipped with a magnetic stirrer, was charged with 18 mg (0.031 mmol) of a a catalyst having the formula Me$_2$SiCp"$_2$NdCH(TMS)$_2$, wherein Cp" and TMS are as defined supra, and 1.04 g (10 mol) of styrene. The flask was connected to a high vacuum line and 10 mL of toluene and 0.2 mL (0.18 g, 1.62 mmol) of phenylsilane were condensed in under vacuum at −78° C. The mixture was then exposed to ethylene at 1 atmosphere and vigorously stirred for 20 hours at 23° C. The reaction was stopped by the addition of methanol and the volatiles were evaporated off in vacuo. The resulting polymer was washed with methanol and acetone and dried under high vacuum to provied a yield of 1.70 g.

Polymer composition: 26% styrene incorporation in the polymer based on $^1$H NMR analysis; M$_n$=3300.

$^1$H NMR (C$_2$D$_2$Cl$_4$, 110° C.): δ7.70–6.95 (m, Ph, strong), 4.35 (m, PhH$_2$Si—), 2.80–2.30 (m, —CH(Ph)—), 1.70–1.40 (m, CH$_2$CHPh—, strong), 1.40–0.90 (m, CH$_2$CH$_2$—, very strong).

$^{13}$C NMR (C$_2$D$_2$Cl$_4$, 110° C.): δ146.61, 135.67, 135.63, 135.19, 129.70, 129.59, 129.42, 128.37, 128.32, 128.21, 128.09, 127.94, 127.85, 127.78, 127.67, 127.19, 127.09, 126.95, 125.57, 125.00, 46.05, 45.75, 36.83, 36.75, 36.65, 29.62, 29.60 29.468, 29.32, 27.55, 27.37, 25.42, 22.02, 16.61.

That which is claimed is:

1. A process for preparing a silyl-terminated polyethylene comprising:
reacting
(A) at least one monomer selected from the group consisting of ethylene and a combination of ethylene and an α-olefin having the formula

H$_2$C=CH(R)

in which R represents a monovalent group selected from the group consisting of alkyl radical having 1 to 10 carbon atoms and aryl radical; and (B) a silane having the formula R$^2$R$^3$R$^4$SiH wherein R$^2$, R$^3$ and R$^4$ each represents a monovalent group independently selected from the group consisting of hydrogen, alkyl radicals having 1 to 4 carbon atoms, aryl radicals, alkylaryl radicals, arylalkyl radicals, alkoxy radicals having 1–4 carbon atoms, phenoxy radical, fluorinated alkyl radicals having 3 to 6 carbon atoms, dialkylamino group in which the alkyl groups contain 1 to 4 carbon atoms and a diorganopolysiloxane chain containing 1 to 10 siloxane units, said reaction taking place in the presence of (C) a catalyst comprising a metallocene compound having its formula selected from the group consisting of

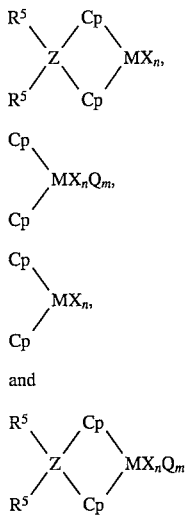

and

wherein Cp denotes a cyclopentadienyl or a substituted cyclopentadienyl radical, Z is selected from the group consisting of Si, C, Ge and Sn, R$^5$ is selected from the group consisting of alkyl radicals having 1 to 4 carbon atoms, aryl radicals and methoxy, M is a metal selected from the group consisting of Group 3 elements, Group 4 elements and Lanthanide series elements, X is a metal ligand selected from the group consisting of hydrogen, halogen, alkyl radicals having 1 to 8 carbon atoms, substituted alkyl radicals having 1 to 8 carbon atoms, allylic radicals having 3 to 6 carbon atoms and aryl radicals having 6 to 8 carbon atoms, Q is an anionic counterion of an element selected from the group consisting of boron, aluminum, gallium, zinc and cadmium and n and m are integers, each having a value of 1 to 3 such that (m+n) is selected to satisfy the valence of said metal M.

2. The process of claim 1, wherein catalyst (C) consists essentially of a combination of said metallocene compound and a co-catalyst selected from the group consisting of an alkylalumoxane, a trialkyl boron compound in which the alkyl radicals have 1 to 8 carbon atoms, a triaryl boron compound having 6 to 8 carbon atoms and a compound of the formula AlG$_k$R$^6$$_{(3-k)}$ in which G is selected from the group consisting of hydrogen, halogen, alkyl radicals having 1–8 carbon atoms, aryl radicals having 6 to 8 carbon atoms, R$^6$ is an alkyl radical having 1–8 carbon atoms and k is an integer having a value of 0 to 3.

3. The process according to claim 1, wherein component (A) is ethylene.

4. The process according to claim 1, wherein component (A) is a combination of ethylene and a compound selected from the group consisting of styrene, propene and 1-hexene.

5. The process according to claim 1, wherein said silane (B) is selected from the group consisting of phenylsilane, diphenylsilane, phenylmethylsilane, pentamethyldisiloxane, methylsilane and dimethylsilane.

6. In a method for preparing polyethylene comprising polymerizing ethylene or a combination of ethylene and an α-olefin in the presence of a metallocene catalyst and subsequently terminating the polymerization with a chain transfer agent, the improvement comprising using a silane as said chain transfer agent, said silane having the formula R$^2$R$^3$R$^4$SiH wherein $R^2$, $R^3$ and $R^4$ each represents a monovalent group independently selected from the group consisting of hydrogen, alkyl radicals having 1 to 4 carbon atoms, aryl radicals, methoxy, fluorinated alkyl radicals having 3 to 6 carbon atoms, dialkylamino group in which the alkyl groups contain 1 to 4 carbon atoms and a diorganopolysiloxane chain having 1 to 10 siloxane units.

7. An interpolymer of ethylene and at least one α-olefin having the formula $$H_2C=CH(R)$$

in which R represents a monovalent group selected from the group consisting of alkyl radical having 1 to 10 carbon atoms and aryl radical, wherein only one terminus of said interpolymer is a silyl group of the formula $$R^2R^3R^4Si-$$

in which $R^2$, $R^3$ and $R^4$ each represents a monovalent group independently selected from the group consisting of hydrogen, alkyl radicals having 1 to 4 carbon atoms, aryl radicals, alkylaryl radicals, arylalkyl radicals, alkoxy radicals having 1–4 carbon atoms, phenoxy radical, fluorinated alkyl radicals having 3 to 6 carbon atoms, dialkylamino group in which the alkyl groups contain 1 to 4 carbon atoms and a diorganopolysiloxane chain containing 1 to 10 siloxane units.

8. The interpolymer according to claim 7, wherein said α-olefin is selected from the group consisting of styrene, propene and 1-hexene.

9. The interpolymer according to claim 7, wherein $R^2$, $R^3$ and $R^4$ are independently selected from the group consisting of hydrogen, methyl and phenyl.

10. A polymer prepared according to the method of claim 1, wherein said component (A) is a combination of ethylene and an α-olefin having the formula $$H_2C=CH(R)$$

in which R represents a monovalent group selected from the group consisting of alkyl radical having 1 to 10 carbon atoms and aryl radical.

11. A polymer according to claim 10, wherein said catalyst (C) consists essentially of a combination of said metallocene compound and a co-catalyst selected from the group consisting of an alkylalumoxane, a trialkyl boron compound in which the alkyl radicals have 1 to 8 carbon atoms, a triaryl boron compound having 6 to 8 carbon atoms and a compound of the formula $AlG_kR^6_{(3-k)}$ in which G is selected from the group consisting of hydrogen, halogen, alkyl radicals having 1–8 carbon atoms, aryl radicals having 6 to 8 carbon atoms, $R^6$ is an alkyl radical having 1–8 carbon atoms and k is an integer having a value of 0 to 3.

12. A polymer according to claim 10, wherein said component (A) is a combination of ethylene and a compound selected from the group consisting of styrene, propene and 1-hexene.

13. A polymer according to claim 10, wherein said silane (B) is selected from the group consisting of phenylsilane, diphenylsilane, phenylmethylsilane, pentamethyldisiloxane, methylsilane and dimethylsilane.

14. A polymer according to claim 11, wherein said silane (B) is selected from the group consisting of phenylsilane, diphenylsilane, phenylmethylsilane, pentamethyldisiloxane, methylsilane and dimethylsilane.

15. A polymer according to claim 12, wherein said silane (B) is selected from the group consisting of phenylsilane, diphenylsilane, phenylmethylsilane, pentamethyldisiloxane, methylsilane and dimethylsilane.

* * * * *